United States Patent
Ruggiero

(10) Patent No.: US 12,330,551 B2
(45) Date of Patent: Jun. 17, 2025

(54) METHOD FOR OPERATING AT LEAST ONE VEHICLE HEADLIGHT AND VEHICLE

(71) Applicant: MERCEDES-BENZ GROUP AG, Stuttgart (DE)

(72) Inventor: Adriano Ruggiero, Pforzheim (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 128 days.

(21) Appl. No.: 18/267,836

(22) PCT Filed: Oct. 13, 2021

(86) PCT No.: PCT/EP2021/078275
§ 371 (c)(1),
(2) Date: Jun. 16, 2023

(87) PCT Pub. No.: WO2022/128201
PCT Pub. Date: Jun. 23, 2022

(65) Prior Publication Data
US 2024/0051456 A1     Feb. 15, 2024

(30) Foreign Application Priority Data

Dec. 18, 2020  (DE) ...................... 10 2020 007 773.0

(51) Int. Cl.
*B60Q 1/14*     (2006.01)

(52) U.S. Cl.
CPC ........ *B60Q 1/143* (2013.01); *B60Q 2300/054* (2013.01); *B60Q 2300/056* (2013.01)

(58) Field of Classification Search
CPC ............. B60Q 1/143; B60Q 2300/054; B60Q 2300/056; F21W 2102/13; G06V 10/82
See application file for complete search history.

(56) References Cited

U.S. PATENT DOCUMENTS

| 10,252,662 B2 | 4/2019 | Hoffmann |
| 2014/0029791 A1 | 1/2014 | Mori et al. |
| (Continued) | | |

FOREIGN PATENT DOCUMENTS

| DE | 102011081428 A1 | 2/2013 |
| DE | 102014216152 A1 | 2/2016 |
| (Continued) | | |

OTHER PUBLICATIONS

International Search Report and Written Opinion mailed Jan. 21, 2022 in related/corresponding International Application No. PCT/EP2021/078275.

(Continued)

*Primary Examiner* — Abdullah A Riyami
*Assistant Examiner* — Syed M Kaiser
(74) *Attorney, Agent, or Firm* — PATENT PORTFOLIO BUILDERS PLLC

(57) ABSTRACT

A method for operating a vehicle headlight involves operating the vehicle headlight with an additional light switched on. If it is necessary to dim at least one region of the light field or to switch the vehicle headlight into the dim ground lighting mode, the additional light is deactivated. The sensor signal of the computing unit is checked to determine whether it is still required to at least partially dim the light field or switch the vehicle headlight into the dim ground lighting mode. If it is still required to at least partially dim the light field, at least the region of the light field is dimmed or the vehicle headlight is switched into the dim ground lighting mode. Otherwise, the vehicle headlight is operated in the bright ground lighting mode with an additional light switched on.

12 Claims, 1 Drawing Sheet

(56) References Cited

U.S. PATENT DOCUMENTS

Figure 1:
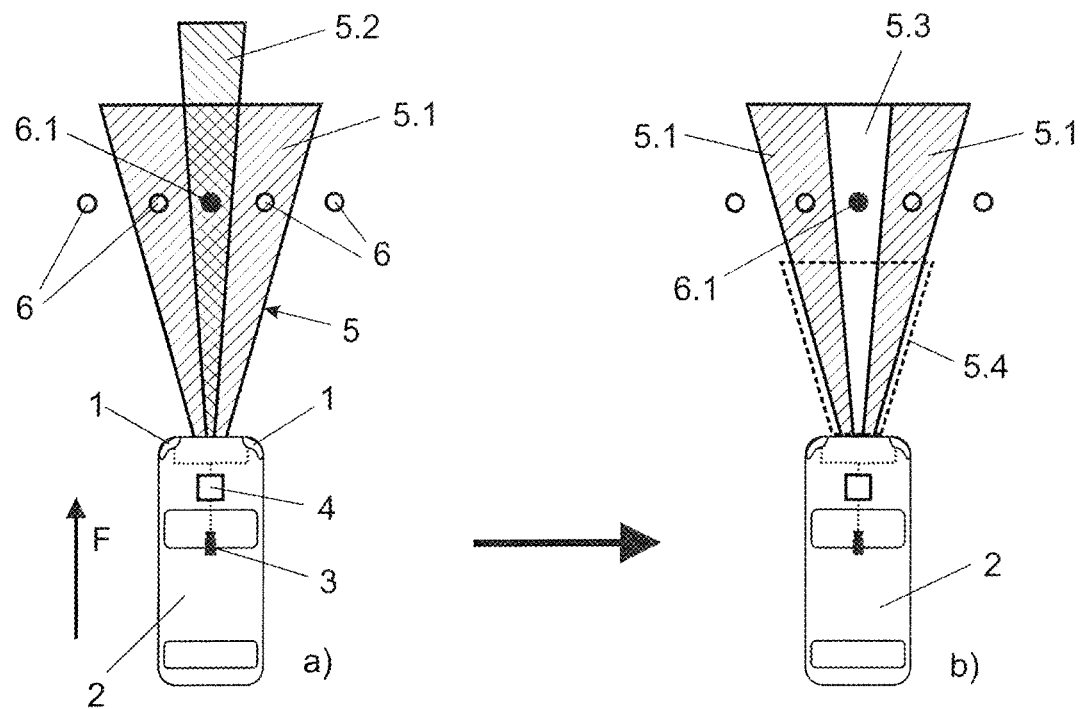

2016/0185276 A1    6/2016  Tanaka et al.
2017/0036592 A1*   2/2017  Hoffmann .............. B60Q 1/143
2019/0196480 A1*   6/2019  Taylor .................. G05D 1/0223

FOREIGN PATENT DOCUMENTS

| DE | 102015214760 A1 * | 2/2017 | ............ B60Q 1/143 |
| EP | 2600329 A1 | 6/2013 | |
| EP | 3708427 A1 | 9/2020 | |
| JP | 2012030673 A | 2/2012 | |
| JP | 2014024411 A | 2/2014 | |
| JP | 2016120871 A | 7/2016 | |

OTHER PUBLICATIONS

Office Action dated May 30, 2024 in related/corresponding JP Application No. 2023537172.
Office Action dated Mar. 31, 2025 in related/corresponding KR Application No. 2023-7018639.

* cited by examiner

METHOD FOR OPERATING AT LEAST ONE VEHICLE HEADLIGHT AND VEHICLE

BACKGROUND AND SUMMARY OF THE INVENTION

Exemplary embodiments of the invention relate to a method for operating at least one vehicle headlight and to a vehicle for carrying out the method.

Vehicles typically have a lighting device in the form of headlights for lighting a vehicle environment, which also enables a safe operation of the vehicle in darkness, for example at night. The vehicle headlights typically have different operating modes in which the vehicle headlights emit light with a different light characteristic. For this purpose, a light range and/or brightness of the headlight light are adjusted in particular. If further traffic participants are located in a front region ahead of the vehicle and/or if the vehicle is driving through a city, then the vehicle headlights are usually operated with dim light in order not to dazzle further traffic participants. If no further traffic participants are located ahead of the vehicle when travelling on an A-road or motorway, then the vehicle headlights can be operated with high beam to enable a person driving a vehicle to see further in darkness.

So-called high beam assistants are also known, which undertake an automatic light range and/or brightness regulation of the headlight light depending on a traffic participant recognized by the environment monitoring system. Thus, for example, an automatic switch is made from high beam to low beam or a region of a headlight light cone occupied by further traffic participants is omitted or dimmed. It can thus be avoided that further traffic participants are dazzled despite the emission of high beam. Matrix or pixel headlights are in particular used as headlights for this purpose, as specific light patterns can be generated particularly easily with these headlights.

Vehicle headlights are further known that comprise an additional lighting means in addition to a lighting means comprising ground lighting, using which a particularly long-range and bright light beam can be generated. Such a light beam is also described as high beam spot, and is based on a comparatively bright light being concentrated on a particularly small surface. It can here occur that a high beam assistant dims high beam emitted from the vehicle headlights excessively frequently and unnecessarily due to erroneous detections when controlling a vehicle headlight with high beam spot. In addition to the vehicle headlights and a control device for controlling the headlights, a high beam assistant also comprises an optical sensor, by means of which a vehicle environment is monitored. If the optical sensor receives light from the vehicle environment, the light intensity of which lies above a pre-determined value, this indicates an oncoming vehicle. In this case, high beam emitted from the vehicle headlights needs to be dimmed to not dazzle the potential oncoming traffic participant. It can be the case, however, that it is not actually an oncoming vehicle with headlights switched on, but rather a static or dynamic environment object that reflects light emitted by the vehicle headlights back in the direction of the vehicle. In this case, no dimming is necessary. If a reflecting object such as a reflector of a road delineator or a bar of a barrier is lit by a high beam spot, then the object casts a particularly large amount of light back in the direction of the vehicle with the activated high beam spot, whereupon the reflecting object is particularly frequently confused with a traffic participant emitting light.

DE 10 2011 081 428 A1 discloses a way for avoiding such erroneous detections using a method for determining an object class of an object from which light is emitted and/or reflected to a vehicle. A high beam assistant of a vehicle comprises two cameras as optical sensors that have an offset from each other. The cameras can also only have a comparatively low offset from one another, for example it can be a stereo camera. Using the two cameras, light emitted or reflected by environment objects is recorded from different angles, which enables a differentiation between an object that itself emits light, such as an oncoming traffic participant, and an object reflecting light such as a reflector. An erroneous detection rate with which a high beam assistant erroneously recognizes an oncoming traffic participant, and thus dims the light, can thus be reduced. The document also explains that, when an actual traffic participant is recognized, additional lighting means of a vehicle headlight can also be deactivated in addition to dimming the high beam. To carry out the method disclosed in the document, at least two cameras are necessary to monitor the environment, however.

Exemplary embodiments of the present invention are directed to an improved method for operating at least one vehicle headlight having an additional light for generating a far-reaching and bright high beam, using which an unnecessary dimming of the vehicle headlights can be reliably avoided or at least reduced, even when using a high beam assistant that only uses an optical sensor.

In a method for operating at least one vehicle headlight, wherein the vehicle headlight is equipped to emit a light field that can be brightened by switching on at least one additional light, at least the following methods steps are carried out according to the invention:

- operating the vehicle headlight in the bright ground lighting mode with an additional light switched on;
- If it is determined by evaluating the sensor signal that it is necessary to dim at least one region of the light field or it is necessary to switch the vehicle headlight into the dim ground lighting mode: deactivating the additional light;
- checking the sensor signal of the computing unit to determine whether it is still required to at least partially dim the light field or switch the vehicle headlight into the dim ground lighting mode;
- if this is the case: dimming at least the region of the light field or switching the vehicle headlight into the dim ground lighting mode; or
- if this is not the case: operating the vehicle headlight in the bright ground lighting mode with additional light switched on.

If an environment object that reflects light particularly well is illuminated by the vehicle headlight with the additional light switched on, then the environment object also reflects light with a comparatively high light intensity back in the direction of the vehicle. Thus, a probability that the environment object is confused with a further traffic participant increases, as the environment object appears to the optical sensor as a traffic participant that itself emits light, due to the high light intensity. In this case, the light field emitted by the vehicle headlight should be at least partially dimmed or the vehicle headlight should be switched into the dim ground lighting mode. If, however, the additional lights are not operated, then a probability that the environment object is incorrectly identified as a further traffic participant decreases, as the environment object now reflects too little light to appear like a traffic participant that itself emits light. If, after switching off the additional light, the sensor signal is checked by the computing unit again, then it is possible to differentiate between a traffic participant and an environment object with a high degree of reliability. If it is actually a further traffic participant, the light field emitted by the vehicle headlight is then at least partially dimmed or the vehicle headlight is switched into the dim ground lighting mode. If the computing unit determines that it is an environment object, then the additional light can be switched back on with no risk. By carrying out the method according to the invention, no changes to the construction of a high beam assistant are necessary, whereby the method according to the invention can also be used by existing vehicles particularly easily.

The dim ground lighting mode can, for example, be low beam and the bright ground lighting mode can be high beam.

Different sensors can be used as an optical sensor. For example, it can be a brightness sensor. An advantageous development of the method provides, however, that the optical sensor is at least one camera. The camera generates camera images that are evaluated by the computing unit. Particularly comprehensive information can thus be obtained. As modern vehicles often have a camera, there is no requirement to provide additional hardware in the vehicle. The camera can be any camera, such as a multi-purpose camera. This camera can be designed as a mono- or stereo-camera and record light in the visible and/or infra-red spectrum. In particular in the case of a camera equipped to record infra-red light, environment objects can be particularly reliably recorded in darkness.

Corresponding to a further advantageous embodiment of the method, by recognizing at least one object to exclude in at least one camera image generated by the camera, it is determined that it is necessary to dim at least one region of the light field or switch the vehicle headlight into the grim ground lighting mode. For example, the object to be excluded is a further traffic participant, for example a cyclist, passenger car, heavy goods vehicle, or any road vehicle approaching the vehicle. The further traffic participant can also drive in a same direction of travel as the vehicle. A further traffic participant driving in the same direction being dazzled is thus also possible, as vehicles typically have wing and internal mirrors that direct light emitted from the vehicle in the direction of a person driving the vehicle, whereby the person can be dazzled. The object to be excluded can also be a building. Light emitted by the vehicle thus falls through a window into the building, whereby people located in the building can be disturbed.

A further advantageous embodiment of the method further provides that an object to be excluded is recognized in a camera image by at least one partial region of the camera image being covered by a light, the light intensity of which lies above a pre-determined threshold value. As further traffic participants also typically emit light themselves in darkness, in particular at night, in order to orientate themselves in the darkness, an object can be identified as a further traffic participant when the object is recognized as emitting light. In this case, the object emitting light is classified as an object to be excluded, whereupon the vehicle headlights are dimmed. For this purpose, a threshold value for a light intensity of the light emitted by the environment object is determined so that the object is recognized as a further traffic participant or an object to be excluded. Thus, for example, an environment object emitting light, such as a construction works marker or a street light can be differentiated from an approaching vehicle.

Artificial intelligence, in particular using an artificial neural network, is preferably used to evaluate a camera image. Camera images can be evaluated with artificial intelligence, in particular an artificial neural network such as a convolutional neural network. An error detection rate with which a feature to be recognized is falsely recognized in a camera image can thus be reduced.

In the case of a vehicle having at least one vehicle headlight, a computing unit and an optical sensor, the computer unit is equipped according to the invention to carry out a method previously described. The vehicle can be any vehicle, such as a passenger car, heavy goods vehicle, transporter, bus, or the like. A separate computing unit can be provided to carry out the method. It can also be a central on-board computer or a control device of a vehicle subsystem, however. Analogously, it can be any vehicle headlight. This vehicle headlight can have several lights for emitting the ground lighting. The vehicle headlight can have any bulb, for example a light bulb, halogen bulb or xenon bulb, fluorescent tubes, a laser, or LEDs as a lighting means, for example. In particular, the vehicle headlight is a so-called matrix or pixel headlight. The vehicle headlight can comprise one or several reflectors, mirrors, lenses and/or prisms. These can be controlled using actuators, for example to move them. A light dispersal direction of the light emitted by the vehicle headlight can thus be controlled, for example. A light intensity of the light field can be changed and/or individual regions of the light field can be dimmed in a targeted manner by switching individual lighting means on or off in a targeted manner. With the assistance of the additional light, the vehicle headlight is able to emit a so-called high beam spot so that it can illuminate environmental regions particularly far away from the vehicle with a particularly high brightness.

Further advantageous embodiments of the method according to the invention and the vehicle result from the exemplary embodiments, which are described in more detail in the following with reference to the figures.

BRIEF DESCRIPTION OF THE DRAWING FIGURES

In the figures:

FIGS. 1a) and 1b) show schematic depictions of a known manner of operating of a high beam assistant and;

FIGS. 2a)-2$c_2$) show schematic depictions of a manner of operating of the high beam assistant according to a method according to the invention.

DETAILED DESCRIPTION

FIG. 1a) shows a vehicle 2 having an optical sensor 3, a computing unit 4, and two vehicle headlights 1. The vehicle headlights 1 cast a light field 5 into an environment region lying ahead of the vehicle 2 in a direction of travel F, wherein, in the depiction of the figures, the light field 5 originates from a center of the vehicle and not from the vehicle headlights 1 for space reasons. The light field 5 consists of two regions 5.1 and 5.2. The region 5.2 is located above the region 5.1. In the region 5.1, the vehicle headlights 1 cast light, for example high beam, into the environment according to a bright ground lighting mode. One or both of the vehicle headlights 1 comprise an additional light, using which a particularly bright and high-range light according to the region 5.2 is cast into the environment. This light is called a high beam spot. An environment region located far away in front of the vehicle 2 can thus be lit particularly brightly, which enables a comfortable and secure operation of the vehicle 2 by a person driving the vehicle at night. The optical sensor 3, here in the form of a camera, monitors the environment. Sensor signals generated by the optical sensor 3 are evaluated by the computing unit 4 to recognize potential objects 6 or further traffic participants. Depending on recognized objects 6 or traffic participants, the computing unit 4 emits control signals to control the vehicle headlight 1 to change a light characteristic of the light field 5. Thus, when a further traffic participant, in particular in the case of a traffic participant approaching the vehicle 2, a region 5.3 of the light field 5 is excluded or the bright ground lighting mode is switched into a dim ground lighting mode in order not to dazzle the approaching traffic participant.

In the example in FIG. 1*a*), the high beam spot, and thus the region 5.2 of the light field 5, hits an object 6.1, for example a reflector of a road delineator, which reflects the high beam spot back in the direction of the vehicle 2, whereupon the computing unit 4 determines a particularly high light intensity in a camera image generated by the camera, and thus recognizes that an approaching traffic participant is nearing. Correspondingly, the computing unit 4 emits a control signal to dim the region 5.3 of the light field 5. The object 6.1 is thus excluded from the lighting of the vehicle 2, or the vehicle headlights 1 are switched into the dim ground lighting mode, whereupon the vehicle headlights 1 light a comparatively small region 5.4 relative to the region 5.1, in particular with a lower degree of brightness.

Figure 2:
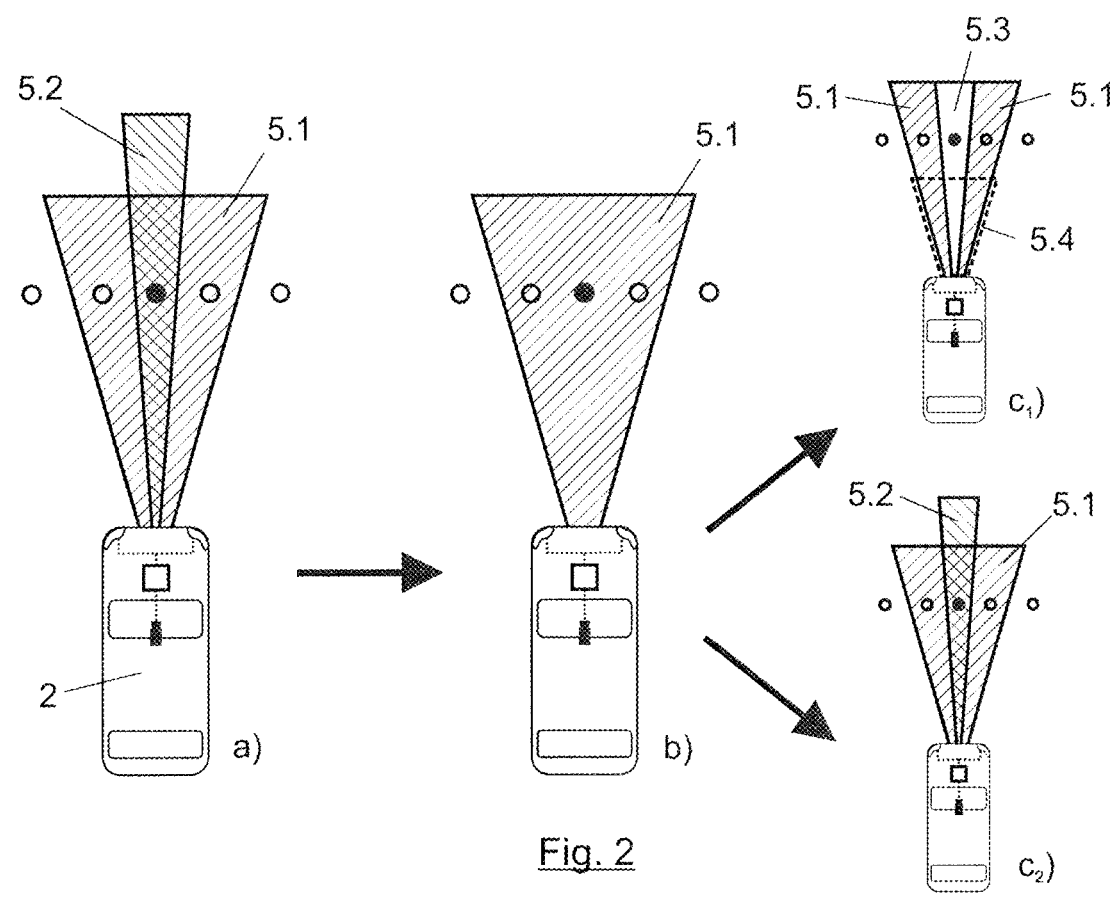

As the object 6.1 is not an approaching traffic participant, however, but rather a road delineator, it would be unnecessary to dim the region 5.3 or to operate the vehicle headlights 1 in the dim ground lighting mode. Using the method according to the invention, a process for excluding or dimming the vehicle headlights 1 shown in FIG. 2 is shown.

FIG. 2*a*) corresponds to a traffic situation from FIG. 1*a*). If an object to be excluded, say an approaching traffic participant, is recognized in a camera image, the high beam spot, say the additional light, is thus switched off first, which is shown in FIG. 2*b*). Here, the vehicle headlights 1 emit light corresponding to the bright ground lighting mode only in the region 5.1. The object 6.1 now reflects the light emitted by the vehicle headlights 1 less strongly in the direction of the vehicle 2, whereby a new evaluation of camera images by the computing unit 4 can reliably determine a further traffic participant or an object 6. Correspondingly, after the new camera image evaluation according to FIGS. 2*c*₁) and 2*c*₂), the region 5.3 of the light field is dimmed, the vehicle headlight 1 is operated in the dim ground lighting mode or the high beam spot is switched on again. Unnecessary dimming or exclusions of the vehicle headlights 1 can thus be avoided. Driving comfort when using the vehicle 2 in darkness can thus be avoided.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating at least one vehicle headlight of a vehicle, the method comprising:
   generating, by at least one optical sensor, sensor signals for an environment external to the vehicle;
   evaluating the sensor signals to generate a control signal;
   switching the at least one vehicle headlight between a dim light ground lighting mode and a bright light ground lighting mode depending on the control signal, wherein a light field emitted by the at least one vehicle headlight is at least partially dimmed in the bright ground lighting mode depending on the control signal or the light field emitted by the at least one vehicle headlight is at least partially brightened by switching on at least one additional light;
   operating the at least one vehicle headlight in the bright ground lighting mode with the at least one additional light switched on;
   determining, based on the sensor signals, whether it is necessary to dim at least one region of the light field or whether it is necessary to switch the at least one vehicle headlight into the dim ground lighting mode, wherein when it is necessary to dim at least one region of the light field or it is necessary to switch the at least one vehicle headlight into the dim ground lighting mode, the additional light is deactivated; and
   determining, based on the sensor signals, whether it is still required to at least partially dim the light field or switch the at least one vehicle headlight into the dim ground lighting mode, wherein
      when it is still required to at least partially dim the light field or switch the at least one vehicle headlight into the dim ground lighting mode, at least at least one region of the light field is dimmed or the vehicle headlight is switched into the dim ground lighting mode, and
      when it is not still required to at least partially dim the light field or switch the at least one vehicle headlight into the dim ground lighting mode, the at least one vehicle headlight is operated in the bright ground lighting mode with the at least one additional light switched on.

2. The method of claim 1, wherein the at least one optical sensor is at least one camera.

3. The method of claim 2, wherein by recognizing at least one object to exclude in at least one camera image generated by the at least one camera, it is determined that it is necessary to dim the at least one region of the light field or to switch the vehicle headlight into the dim ground lighting mode.

4. The method of claim 3, wherein the at least one object to be excluded is recognized in the at least one camera image by at least one partial region of the at least one camera image being covered by a light, a light intensity of the light being above a pre-determined threshold value.

5. The method of claim 2, wherein a camera image generated by the at least one camera is evaluated using an artificial neural network.

6. A vehicle, comprising:
   at least one vehicle headlight;
   at least one optical sensor; and
   a computing unit coupled to the at least one vehicle headlight and the at least one optical sensor, wherein the computing unit is configured to receive, from the at least one optical sensor, sensor signals for an environment external to the vehicle;

evaluate the sensor signals to generate a control signal;

switch the at least one vehicle headlight between a dim light ground lighting mode and a bright light ground lighting mode depending on the control signal, wherein a light field emitted by the at least one vehicle headlight is at least partially dimmed in the bright ground lighting mode depending on the control signal or the light field emitted by the at least one vehicle headlight is at least partially brightened by switching on at least one additional light;

operate the at least one vehicle headlight in the bright ground lighting mode with the at least one additional light switched on;

determine, based on the sensor signals, whether it is necessary to dim at least one region of the light field or whether it is necessary to switch the at least one vehicle headlight into the dim ground lighting mode, wherein when it is necessary to dim at least one region of the light field or it is necessary to switch the at least one vehicle headlight into the dim ground lighting mode, the additional light is deactivated;

determine, based on the sensor signals, whether it is still required to at least partially dim the light field or switch the at least one vehicle headlight into the dim ground lighting mode, wherein when it is still required to at least partially dim the light field or switch the at least one vehicle headlight into the dim ground lighting mode, at least at least one region of the light field is dimmed or the vehicle headlight is switched into the dim ground lighting mode, and when it is not still required to at least partially dim the light field or switch the at least one vehicle headlight into the dim ground lighting mode, the at least one vehicle headlight is operated in the bright ground lighting mode with the at least one additional light switched on.

7. The vehicle of claim 6, wherein the at least one optical sensor is at least one camera.

8. The vehicle of claim 7, wherein a camera image generated by the at least one camera is evaluated using an artificial neural network.

9. A method for operating at least one vehicle headlight of a vehicle, the method comprising:

operating the at least one vehicle headlight in a bright ground lighting mode with at least one additional light switched on;

generating, by an optical sensor, first sensor signals for an environment external to the vehicle;

evaluating an object in the first sensor signals to generate a first control signal;

determining, based on the first sensor signals, that it is necessary to dim at least one region of the light field or it is necessary to switch the at least one vehicle headlight into the dim ground lighting mode, wherein when it is necessary to dim at least one region of the light field or it is necessary to switch the at least one vehicle headlight into the dim ground lighting mode, dimming the at least one region of the light field or switching the at least one vehicle headlight into the dim ground lighting mode, and deactivating the at least one additional light;

generating, by the optical sensor while the additional light is deactivated, second sensor signals for the environment external to the vehicle;

evaluating the object in the second sensor signals to generate a second control signal;

determining, based on the second sensor signals, that it is no longer required to at least partially dim the light field or switch the at least one vehicle headlight into the dim ground lighting mode; and operating, based on the determination that it is no longer required to at least partially dim the light field or switch the at least one vehicle headlight into the dim ground lighting mode, the at least one vehicle highlight in the bright ground lighting mode with the at least one additional light switched on.

10. The method of claim 9, wherein the at least one optical sensor is at least one camera.

11. The method of claim 9, wherein the object is recognized in at least one camera image generated by the at least one camera based on a light intensity of the of the object in the at least one camera image being above a pre-determined threshold value.

12. The method of claim 10, wherein a camera image generated by the at least one camera is evaluated using an artificial neural network.

* * * * *